United States Patent
Chopra et al.

(10) Patent No.: US 12,500,298 B2
(45) Date of Patent: Dec. 16, 2025

(54) SEALING LAYER FOR BIODEGRADABLE ELECTROCHEMICAL DEVICE AND METHODS THEREOF

(71) Applicant: XEROX CORPORATION, Norwalk, CT (US)

(72) Inventors: Naveen Chopra, Oakville (CA); Alexandros Vasileiou, Toronto (CA); Gregory McGuire, Oakville (CA); Valerie M. Farrugia, Oakville (CA); Nan-Xing Hu, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 805 days.

(21) Appl. No.: 17/805,736

(22) Filed: Jun. 7, 2022

(65) Prior Publication Data

US 2023/0395910 A1    Dec. 7, 2023

(51) Int. Cl.
*H01M 50/186* (2021.01)
*C09D 11/023* (2014.01)
*C09D 11/037* (2014.01)
*C09D 11/104* (2014.01)
*H01M 50/11* (2021.01)
*H01M 50/141* (2021.01)
*H01M 50/193* (2021.01)

(52) U.S. Cl.
CPC ......... *H01M 50/186* (2021.01); *C09D 11/023* (2013.01); *C09D 11/037* (2013.01); *C09D 11/104* (2013.01); *H01M 50/11* (2021.01); *H01M 50/141* (2021.01); *H01M 50/193* (2021.01)

(58) Field of Classification Search
None
See application file for complete search history.

(56) References Cited

U.S. PATENT DOCUMENTS

| | | | |
|---|---|---|---|
| 5,397,660 A * | 3/1995 | Rossoll ............... | H01M 50/557 429/163 |
| 10,752,772 B1 | 8/2020 | Kogot et al. | |
| 11,961,972 B1 * | 4/2024 | Smithyman ........... | H01M 4/139 |
| 12,098,275 B2 | 9/2024 | Vasileiou et al. | |
| 2016/0256926 A1 * | 9/2016 | Ruppert .................. | B22F 10/32 |
| 2017/0225396 A1 * | 8/2017 | Tom ....................... | B33Y 10/00 |
| 2023/0056630 A1 * | 2/2023 | Gardner ................. | B33Y 80/00 |

* cited by examiner

*Primary Examiner* — Alix E Eggerding
(74) *Attorney, Agent, or Firm* — MH2 Technology Law Group LLP

(57) ABSTRACT

Examples of the present disclosure include an electrochemical device. The electrochemical device includes a first substrate layer. The electrochemical device also includes an anode disposed upon the first substrate layer. The electrochemical device also includes a second substrate layer. The electrochemical device also includes a cathode disposed upon the second substrate layer. The electrochemical device also includes an electrolyte composition disposed between and in contact with the anode and the cathode. The electrochemical device also includes a sintered sealing layer composition disposed between the first substrate layer and the second substrate layer. A sintered sealing layer composition and methods for producing are also disclosed.

19 Claims, 6 Drawing Sheets

FIG. 4

SEALING LAYER FOR BIODEGRADABLE ELECTROCHEMICAL DEVICE AND METHODS THEREOF

TECHNICAL FIELD

The presently disclosed examples or implementations are directed to biodegradable electrochemical devices, sealing layers thereof, and fabrication methods for the same.

BACKGROUND

The number of batteries being produced in the world is continuously increasing as a consequence of the growing need for portable and remote power sources. Particularly, a number of new technologies require batteries to power embedded electronics. For example, embedded electronics, such as portable and wearable electronics, Internet of Things (IoT) devices, patient healthcare monitoring, structural monitoring, environmental monitoring, smart packaging, or the like, rely on batteries for power. While conventional batteries may be partially recycled, there are currently no commercially available batteries that are environmentally friendly or biodegradable. As such, an increase in the manufacture and use of conventional batteries results in a corresponding increase in toxic and harmful waste in the environment if not properly disposed of or recycled. In view of the foregoing, there is a need to develop improved biodegradable batteries; especially for applications that utilize disposable batteries for a limited time before being discarded.

Further, to meet the demand for flexible, low-cost, medium or low performance batteries, all-printed batteries have been developed. Batteries require moisture to maintain electrolyte activity to deliver current. Maintaining adequate hydration of thin film printed batteries and other electrochemical devices is especially challenging owing to their high surface area and the nature of their assembly. A robust sealing layer or gasket can be used to prevent drying out of the cells and other sections or layers within an electrochemical device. Many adhesives and sealants are non-biodegradable, and do not meet compostability standards to enable a fully compostable battery or electrochemical device. Furthermore, the use of adhesives or glue can be prohibitive in terms of cleanliness and applicability to an all-printed approach to make a thin-film printed battery or electrochemical device.

There is a need for processes to create biodegradable printable sealing layer with good fidelity, (defect-free, controlled thickness, and uniform properties) and electrochemical devices such as batteries made using such processes.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the present disclosure include an electrochemical device. The electrochemical device also includes a first substrate. The device also includes a first electrode disposed upon the first substrate. The device also includes a second substrate. The device also includes a sintered sealing layer composition disposed between the first substrate and the second substrate.

Implementations of the electrochemical device may include where a second electrode is disposed upon the first substrate, or where the first electrode and the second electrode are disposed in a lateral x-y plane geometry. The first electrode and the second electrode can be disposed in a stacked geometry. The sintered sealing layer composition forms a moisture barrier around the electrochemical device. The sintered sealing layer composition may include a biodegradable material. The sintered sealing layer composition may include poly(ε-caprolactone) (PCL), polylactic acid (PLA) or a combination thereof. The sintered sealing layer composition may include a biodegradable polymer and an emulsifying additive. The emulsifying additive may include silicon dioxide. The emulsifying additive is present in the sintered sealing layer composition in an amount of from about 1.0% to about 10.0% based on a total weight of the sintered sealing layer composition. The sintered sealing layer composition is disposed between the first substrate and the second substrate in a laterally non-continuous pattern. The sintered sealing layer composition may include a particle having a dv(50) particle size of from about 20 μm to about 150 μm prior to sintering. The sintered sealing layer composition may include a bimodal particle size distribution. The sintered sealing layer may include a first portion and a second portion, the second portion may include a thickness greater than that of the first portion.

A sealing layer composition is disclosed, where the sealing layer composition also includes a biodegradable polymer, where: the biodegradable polymer may include a bimodal particle size distribution, and the sealing layer composition is sintered. The sealing layer composition may include an emulsifying additive. The sintered sealing layer composition is incorporated into an electrochemical device and forms a moisture barrier around the electrochemical device. The electrochemical device may include a battery.

A method of producing a sealing layer is also disclosed. The method of producing a sealing layer also includes preparing a substrate. The method of producing a sealing layer also includes dispensing a sealing layer composition onto the substrate. The method of producing a sealing layer also includes sintering the sealing layer in one or more locations using a laser. The method of producing a sealing layer also includes removing any residual sealing layer composition from the substrate that was not sintered. more computer storage devices, each configured to perform the actions of the methods.

Implementations of the method of producing a sealing layer may include where the sealing layer is subjected to a temperature greater than or equal to a melting temperature of the sealing layer composition. The method of producing a sealing layer may include depositing two or more layers of sealing layer composition.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which:

FIG. 4 depicts a series of scanning electron microscope images of powder particles for use in sealing layer compositions, in accordance with the present disclosure.

Figure 1:
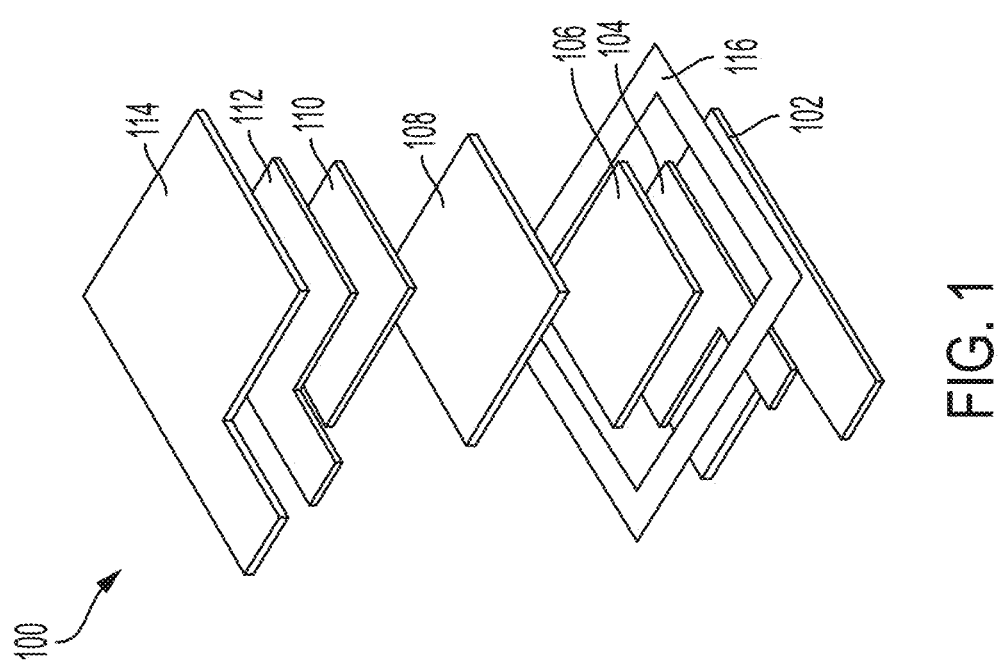
FIG. 1 illustrates an exploded view of an exemplary electrochemical device in a stacked configuration, in accordance with the present disclosure.

It should be noted that some details of the figures have been simplified and are drawn to facilitate understanding of the present teachings rather than to maintain strict structural accuracy, detail, and scale.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes examples containing A, B, or C, multiple examples of A, B, or C, or combinations of A/B, A/C, B/C, A/B/B/BB/C, AB/C, etc. In addition, throughout the specification, the meaning of "a," "an," and "the" include plural references. The meaning of "in" includes "in" and "on."

Reference will now be made in detail to exemplary examples of the present teachings, examples of which are illustrated in the accompanying drawings. Wherever possible, the same reference numbers will be used throughout the drawings to refer to the same, similar, or like parts.

A biodegradable electrochemical device is disclosed herein. As used herein, the term "biodegradable" or "biodegradable material" may refer to a material, component, substance, device, or the like, capable of or configured to be decomposed by living organisms, particularly microorganisms in a landfill within a reasonable amount of time. The material, component, substance, device, or the like may be decomposed into water, naturally occurring gases like carbon dioxide and methane, biomass, or combinations thereof. As used herein, the expression "biodegradable electrochemical device" or "biodegradable device" may refer to an electrochemical device or a device, respectively, where at least one or more components thereof is biodegradable. In some instances, a majority or substantial number of the components of the biodegradable electrochemical device or the biodegradable device are biodegradable. In other instances, all of the polymer components of the biodegradable electrochemical device or the biodegradable device are biodegradable. For example, the polymers and/or other organic-based components of the electrochemical device are biodegradable while the inorganic materials of the electrochemical device disclosed herein, including the metals and/or metal oxides, may not be biodegradable. It should be appreciated that if all polymer and/or organic-based components of an electrochemical device are biodegradable, it is generally accepted that the complete electrochemical device is considered biodegradable. As used herein, the term "compostable" may refer to items that are able to be made into compost or otherwise disposed of in a sustainable or environmentally friendly manner. Compostable materials may be considered to be a subset category of biodegradable materials wherein additional specific environmental temperatures or conditions may be needed to break down a compostable material. While the term compostable is not synonymous with biodegradable, they may be used interchangeably in some instances, wherein the conditions necessary to break down or decompose a biodegradable material are understood to be similar to the conditions necessary to break down a compostable material. As used herein, the term or expression "electrochemical device" may refer to a device that converts electricity into chemical reactions and/or vice-versa. Illustrative electrochemical devices may be or include, but are not limited to, batteries, dye-sensitized solar cells, electrochemical sensors, electrochromic glasses, fuel cells, electrolysers, or the like.

As used herein, the term or expression "environmentally friendly electrochemical device" or "environmentally friendly device" may refer to an electrochemical device or device, respectively, that exhibits minimal, reduced, or no toxicity to the ecosystems or the environment in general. In at least one example, the electrochemical devices and/or components thereof disclosed herein are environmentally friendly.

As used herein, the term or expression "film" or "barrier layer" may refer to a thin, partially or substantially plastic and/or polymeric material that may be used in various electrochemical device components or parts, including, but not limited to substrates, connections, enclosures, barriers, or combinations thereof. Films as described herein may be rigid or flexible, depending upon the inherent physical properties or dimensions of their respective compositions. In at least one example, these films or barrier layers may be environmentally friendly or biodegradable As used herein, the term or expression "enclosure," "barrier," or "water vapor barrier" may refer to materials utilized in partially sealed, fully sealed or otherwise used to prevent moisture, water or other volatile materials from entering or exiting via the barrier of an electrochemical device. In at least one example, these enclosures may be environmentally friendly or biodegradable.

In at least one example, the electrochemical device disclosed herein may include an anode, a cathode (i.e., a current collector and/or an active layer), and one or more electrolyte compositions (e.g., a biodegradable solid aqueous electrolyte composition). In another example, the biodegradable electrochemical device may further include one or more substrates, one or more seals, one or more packages, one or more pouches, one or more enclosures, or combinations thereof.

The electrochemical devices disclosed herein may be flexible. As used herein, the term "flexible" may refer to a material, device, or components thereof that is capable of being bent around a predetermined radius of curvature without breaking and/or cracking. The biodegradable electrochemical devices and/or the components thereof disclosed herein may be bent around a radius of curvature of about 30 cm or less, about 20 cm or less, about 10 cm or less, about 5 cm or less without breaking or cracking.

As used herein, the term "immiscible" refers to a mixture of components that, when combined, form two or more phases that have less than 5 wt. % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt. % solubility in each other at 65° C.

As used herein, the term "nanoparticle" refers to a particulate material having a particulate size ranging from about 1 nm to about 500 nm.

As used herein, the terms "associated," "association," and grammatical variations thereof refer to admixture or blending of nanoparticles and a matrix polymer. Depending on type, nanoparticles may be homogenously or heterogeneously blended with a matrix polymer in the disclosure herein, inclusive of localization upon the surface of a matrix polymer. At least some nanoparticles may be associated with an outer surface of polymer particulates through physical adherence, hydrogen bonding and/or other mechanisms. However, chemical bonding may be occurring to some degree.

As used herein, the term "embed" relative to nanoparticles and a surface of a polymer particulate refers to the nanoparticles being at least partially extending into the surface such that the matrix polymer is in contact with the nanoparticles to a greater degree than would occur if the nanoparticles were simply laid on the surface of the polymer particulates.

As used herein, the term "core" refers to any portion of a polymer particulate that is below a surface layer of the polymer particulate.

As used herein, the term "thermoplastic polymer" refers to a polymer material that softens/melts and hardens/solidifies reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

Herein, $D_{10}$, $D_{50}$, $D_{90}$, and diameter span are used to describe particulate sizes. As used herein, the term "$D_{10}$" refers to a diameter with 10% of the sample (on a volume basis, unless otherwise specified) comprised of particulates having a diameter less than said diameter value. As used herein, the term "$D_{50}$" refers to a diameter with 50% of the sample (on a volume basis, unless otherwise specified) comprised of particulates having a diameter less than said diameter value. As used herein, the term "$D_{90}$" refers to a diameter with 90% of the sample (on a volume basis, unless otherwise specified) comprised of particulates having a diameter less than said diameter value.

As used herein, the terms "diameter span" and "span" and "span size" when referring to diameter provides an indication of the breadth of the particulate size distribution and is calculated as $(D_{90}-D_{10})/D_{50}$ (again, each D-value is based on volume, unless otherwise specified).

Particulate size may be determined by light scattering techniques using a Malvern MASTERSIZER™ 3000 or analysis of optical digital micrographs. Unless otherwise specified, light scattering techniques are used for analyzing particulate sizes herein. For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particulates were dispersed in air and analyzed using the AEROS dry powder dispersion module with the MASTERSIZER™ 3000. The particulate sizes were derived using instrument software from a plot of volume density as a function of size.

Particulate size measurement and diameter span can also be determined by optical digital microscopy. The optical images are obtained using a Keyence VHX-2000 digital microscope using version 2.3.5.1 software for particulate size analysis (system version 1.93).

As used herein, when referring to sieving, pore/screen sizes are described per U.S.A. Standard Sieve (ASTM E11-17).

As used herein, the terms "circularity" and "sphericity" refer to how close a particulate is to a perfect sphere. To determine circularity, optical microscopy images are taken of the particulates. The perimeter (P) and area (A) of the particulates in the plane of the microscopy image is calculated (e.g., using a SYSMEX FPIA 3000 particulate shape and particulate size analyzer, available from Malvern Instruments). The circularity of the particulates is $C_{EA}/P$, where $C_{EA}$ is the circumference of a circle having the area equivalent to the area (A) of the actual particulates.

As used herein, the term "sintering window" refers to the difference between the melting temperature (Tm) onset and the crystallization temperature (Tc) onset, or (Tm-Tc) onset.

Tm, Tm (onset), Tc, and Tc (onset) are determined by differential scanning calorimetry (DSC) per ASTM E794-06(2018) with a 10° C./min ramp rate and a 10° C./min cool rate.

In the disclosure herein, melting points may be determined by ASTM E794-06(2018) with 10° C./min ramping and cooling rates. Glass transition temperature (T g) may be determined by ASTM E1356-08(2014) with 10° C./min ramping and cooling rates.

The softening temperature or softening point of a polymer, unless otherwise specified, is determined by ASTM D6090-17. The softening temperature may be measured by using a cup and ball apparatus available from Mettler-Toledo using a 0.50 gram sample with a heating rate of 1° C./min.

Angle of repose is a measure of the flowability of a powder. Angle of repose measurements are determined using a Hosokawa Micron Powder Characteristics Tester PT-R using ASTM D6393-14 "Standard Test Method for Bulk Solids" characterized by Carr Indices.

Hausner ratio ($H_r$) is a measure of the flowability of a powder and is calculated by $H_r=\rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

As used herein, the term "shear" refers to stirring or a similar process that induces mechanical agitation in a fluid.

As used herein, the term "aspect ratio" refers to length divided by width, wherein the length is greater than the width.

As used herein, the term "biodegradable polymer" refers to a polymer that can be degraded by biological entities and/or environmental conditions into the constituent oligomers and/or monomers and other byproducts, such as those having a lower molecular weight than the parent polymer. Biodegradation in accordance with the present disclosure may be assayed by preparing film from a sample of polymer particulates having dimensions of 0.5 cm×2.0 cm and about 500 μm thickness. Film samples are then placed in 5 mL of phosphate buffer solution (0.2 M, pH 7.0) containing 0.2 mg/mL of lipase obtained from *Pseudomonas cepacia* (≥30 U/mg) and incubated at 37° C. throughout the measurement. To be classified as biodegradable, polymer particulates disclosed herein may lose a percentage of mass in six days under the stated conditions of at least about 40%, or at least about 50%, or at least about 60%, or at least about 80%. Polymer particulates and articles formed therefrom may also be regarded as biodegradable according to ISO 20200 (2015), an international standardized test for polymer disintegration within a laboratory composting environment.

As used herein, the term "biopolymer" refers to a macromolecule containing a plurality of repeating monomer units that is synthesized by a biological organism. Synthetic variants are also encompassed by the term "biopolymer," provided that the synthetic biopolymer is functionally similar to a corresponding natural biopolymer.

As used herein, the term "biomineral" refers to an inorganic compound or a composite of an inorganic compound that is mineralized by a biological organism. Synthetic variants are also encompassed by the term "biomineral," provided that the synthetic biomineral is functionally similar to a corresponding natural biomineral.

Exemplary examples of a 3D printed powder sintered sealing layer composition may include compositions as described herein, and can be included in an electrochemical device, such as a battery, or a biodegradable battery. Sealing layers within an electrochemical device can provide a barrier layer around the periphery of the electrochemical device, thereby encapsulating the electrochemical device. The sealing layer can provide a barrier to prevent or reduce moisture loss or moisture evaporation from one or more components within an electrochemical device. Alternate examples of devices or apparatus including a sealing layer composition as described herein may include, but are not limited to, carbon capture or carbon dioxide reduction devices, galvanic cells, or electrolyzers. While an electrolyzer is a system that can utilize electricity to break water into hydrogen and oxygen in an electrolysis process, other systems that enact a chemical process with the use of electricity may incorporate 3D printed powder sintered sealing layer compositions as described herein.

FIG. 1 illustrates an exploded view of an exemplary electrochemical device in a stacked configuration, in accordance with the present disclosure. As illustrated in FIG. 1, the electrochemical device 100 may include a first substrate 102, a first current collectors 104 disposed adjacent to or on top of the first substrate 102, an anode active layer 106 disposed adjacent to or on top of the first current collector 104, an electrolyte layer 108 disposed adjacent to or on top of the anode 106, a cathode active layer 110 disposed adjacent to or on top of the electrolyte composition 108, a second current collector 112 disposed adjacent to or on top of the cathode active layer 110, and a second substrate 114 disposed adjacent to or on top of the second current collector 112. It should be appreciated that the first current collector 104 and the anode active layer 106 may be collectively referred to herein as an anode of the electrochemical device 100. It should further be appreciated that the second current collector 112 and the cathode active layer 110 may be collectively referred to herein as a cathode of the electrochemical device 100. As illustrated in FIG. 1, the anode and the cathode of the electrochemical device 100 may be arranged in a stacked geometry or configuration such that the anode and the cathode are disposed on top of or below one another.

In certain examples, the electrochemical device 100 may include one or more seals 116, capable of or configured to hermetically seal the current collectors 104, 106, the anode active layer 106, the cathode active layer 110, and the electrolyte composition 108 between the first and second substrates 102, 114 of the electrochemical device 100. For example, as illustrated in FIG. 1, the biodegradable electrical device 100 may include a seal 116 interposed between the first and second substrates 102, 114 and about the current collectors 104, 112, the anode active layer 106, the cathode active layer 110, and the electrolyte composition 108 to hermetically seal the biodegradable electrochemical device 100. For example, the substrates 102, 114 may be melted or bonded with one another or by melting or bonding with the seal 116 to seal the biodegradable electrochemical device 100. In still other examples, each of the current collectors 104, 106, may include a respective tab that may extend outside the body of the electrochemical device 100 to thereby provide connectivity. In some examples, the electrochemical device 100 may be arranged in a side-by-side or coplanar configuration. Further, the anode and the cathode of the electrochemical device 100 may be coplanar such that the anode and the cathode are arranged along the same X-Y plane in a lateral X-Y plane geometry, with a seal surrounding and sealing both in that same plane.

In at least one example, any one or more of the substrates of the electrochemical device 100 may be or include, but is not limited to, a biodegradable substrate. Illustrative biodegradable substrates may be or include, but are not limited to, one or more of polylactic acid (PLA), polylactic-co-glycolic acid (PLGA), silk-fibroin, chitosan, polycaprolactone (PCL), polyhydroxybutyrate (PHB), rice paper, cellulose, or combinations or composites thereof.

The anode active layer 106 of exemplary biodegradable electrochemical devices 100 may be or include, but are not limited to, one or more of zinc (Zn), lithium (Li), carbon (C), cadmium (Cd), nickel (Ni), magnesium (Mg), magnesium alloys, zinc alloys, or the like, or combinations and/or alloys thereof. Illustrative anode active layers or materials thereof may be or include, but are not limited, or the like, or combinations thereof. In at least one example, the anode active layer may include zinc oxide (ZnO) in a sufficient amount to regulate or control $H_2$ gassing.

In at least one example, the anode active layer 106 of exemplary biodegradable electrochemical devices 100 may be prepared or fabricated from an anode paste. For example, the anode active layer may be prepared from a zinc anode paste. The anode paste may be prepared in an attritor mill. In at least one example, stainless steel shot may be disposed in the attritor mill to facilitate the preparation of the anode paste. The anode paste may include one or more metal or metal alloys, one or more organic solvents, one or more styrene-butadiene rubber binders, or combinations thereof. In an exemplary example, the anode paste may include one or more of ethylene glycol, a styrene-butadiene rubber binder, zinc oxide (ZnO), bismuth (III) oxide ($Bi_2O_3$), Zn dust, or combinations thereof. Illustrative organic solvents are known in the art and may be or include, but are not limited to, ethylene glycol, acetone, NMP, or the like, or combinations thereof. In at least one example, any one or more biodegradable binders may be utilized in lieu of or in combination with a styrene-butadiene rubber binder.

The cathode active layer 110 of exemplary biodegradable electrochemical devices 100 may be or include, but are not limited to, one or more of iron (Fe), iron (VI) oxide, mercury oxide (HgO), manganese (IV) oxide ($MnO_2$), carbon (C), carbon-containing cathodes, gold (Au), molybdenum (Mo), tungsten (W), molybdenum trioxide ($MoO_3$), silver oxide ($Ag_2O$), copper (Cu), vanadium oxide ($V_2O_5$), nickel oxide (NiO), copper iodide ($Cu_2I_2$), copper chloride (CuCl), or the like, or combinations and/or alloys thereof. In an exemplary example, the cathode active layer 110 may include manganese (IV) oxide. The carbon and/or carbon-containing cathode active layers may be utilized in aqueous metal-air batteries, such as zinc air batteries.

In at least one example, the cathode active layer 110 may include one or more additives capable of or configured to at least partially enhance the electronic conductivity of the cathode active layer 110. Illustrative additives may be or include, but are not limited to, carbon particles, such as graphite, carbon nanotubes, carbon black, or the like, or the like, or combinations thereof.

In at least one example, the cathode active layer 110 of an exemplary biodegradable electrochemical device 100 may be prepared or fabricated from a cathode paste. For example, the cathode active layer 110 may be prepared from a manganese (IV) oxide cathode paste. The cathode paste may be prepared in an attritor mill. In at least one example, stainless steel shot may be disposed in the attritor mill to facilitate the preparation of the cathode paste. The cathode paste may include one or more metal or metal alloys, one or more organic solvents (e.g., ethylene glycol), one or more styrene-butadiene rubber binders, or combinations thereof. In an exemplary example, the cathode paste may include one or more of ethylene glycol, a styrene-butadiene rubber binder, manganese (IV) oxide ($MnO_2$), graphite, or combinations thereof. Illustrative organic solvents are known in the art and may be or include, but are not limited to, ethylene glycol, acetone, NMP, or the like, or combinations thereof. In at least one example, the one or more organic solvents may be replaced or used in combination with an aqueous solvent, such as water. For example, water may be utilized in combination with manganese (IV) oxide.

In at least one example, each of the anodes and the cathodes, or the active layers 106, 110 thereof may independently include a biodegradable binder. The function of the biodegradable binder is to anchor the particles of each of the respective layers together and provide adhesion to the substrate underneath, the respective layers being the anode current collector 104, the cathode current collector 112 the anode active layer 106, the cathode active layer 110, or combinations thereof. Illustrative biodegradable binders may be or include, but are not limited to, one or more of chitosan, polylactic-co-glycolic acid (PLGA), gelatin, xanthan gum, cellulose acetate butyrate (CAB), polyhydroxybutyrate (PHB), or a combination thereof. In at least one example, any one or more of the biodegradable polymers disclosed herein with regard to the electrolyte composition may also be utilized as the biodegradable binder of the anode, the cathode, components thereof, or any combination thereof. As further described herein, the one or more biodegradable polymers may be cross-linked. As such, the biodegradable binders utilized for the anode, the cathode, and/or the components thereof, may include the cross-linked biodegradable binders disclosed herein with regard to the electrolyte composition.

The electrolyte layer 108 of exemplary biodegradable electrochemical devices 100 may be or include an electrolyte composition. The electrolyte composition may utilize biodegradable polymeric materials. The electrolyte composition may be a solid, aqueous electrolyte composition. The solid, aqueous electrolyte composition may be or include a hydrogel of a copolymer and a salt dispersed in and/or throughout the hydrogel. The copolymer may include at least two polycaprolactone (PCL) chains attached with a polymeric center block (CB). For example, the copolymer may be a block copolymer or a graft copolymer including at least two PCL chains coupled with the polymeric center block, such as PCL-CB-PCL. In another example, the copolymer may be a block copolymer or a graft copolymer including at least one or more of polylactic acid (PLA), polyglycolic acid (PGA), polyethylene imine (PEI) or combinations thereof, coupled with the polymeric center block.

The polymeric center block of the copolymer may be a biodegradable polymer, thereby improving or increasing biodegradability of the solid, aqueous electrolyte composition. The biodegradable polymer of the polymeric center block is preferably naturally occurring. The polymeric center block may be or include, or be derived from, a polymer, such as a biodegradable polymer, including at least two free hydroxyl groups available for reaction with ε-caprolactone, in a non-limiting example. One example of a biodegradable CB polymer is PVA (polyvinyl alcohol).

In at least one example, the polymeric center block of the copolymer may not be a biodegradable polymer. For example, the polymeric center block of the copolymer may be or include, but is not limited to, polyethylene glycol (PEG), hydroxy-terminated polyesters, hydroxyl-terminated polyolefins, such as hydroxy-terminated polybutadiene, or the like, or combinations thereof.

The copolymer, including at least two polycaprolactone (PCL) chains bonded to the polymeric center block, may be a graft copolymer or a block copolymer. Whether the copolymer is a graft copolymer or a block copolymer may be at least partially determined by the number and/or placement of the at least two free hydroxyl groups of the polymeric center block. For example, reacting ε-caprolactone with polymeric center blocks having the hydroxyl groups on monomers along a length of the polymeric center block chain forms graft copolymers. In another example, reacting ε-caprolactone with polymeric center blocks having each of the hydroxyl groups at respective ends of the polymeric center blocks forms block copolymers. Illustrative block copolymers may be or include triblock copolymers, tetrablock copolymers, star block copolymers, or combinations thereof.

The salt may be present in an amount capable of, configured to, or sufficient to provide ionic conductivity. In at least one example, the electrolyte composition may include one or more additives. The one or more additives may be or include, but are not limited to, biodegradable or environmentally friendly nanomaterials. The biodegradable nanomaterials may be capable of or configured to provide and/or improve structural strength of the electrolyte layer or the electrolyte composition thereof without sacrificing flexibility of the electrolyte layer or the electrolyte composition thereof. In at least one example, the electrolyte composition may include an aqueous solvent. For example, the electrolyte composition may include water. In at least one example, the electrolyte composition may include a co-solvent. For example, the electrolyte composition may include water and an additional solvent.

The current collectors 104, 112 of exemplary biodegradable electrochemical devices 100 may be capable of or configured to receive, conduct, and deliver electricity. Illustrative current collectors 104, 112 may be or include, but are not limited to, silver, such as silver microparticles and silver nanoparticles, carbon, such as carbon black, graphite, carbon fibers, carbon nanoparticles, such as carbon nanotubes, graphene, reduced graphene oxide (RGO), or the like, or any combination thereof.

An exemplary formulation of sintered sealing layer composition may include a compostable or biodegradable polymer particle or powder. Non limiting examples of suitable 3D printed powder compositions and methods of manufacture for creating compostable or biodegradable batteries using a printed powder selective laser sintering (SLS) approach to create a sintered sealing layer composition and sintered sealing layer can include the use of biodegradable materials such as cellulose acetate, cellulose acetate butyrate, cellulose acetate propionate, cellulose nitrate, polyhydroxyalkanoates (PHA) such as polyhydroxybutyrate (PHB), poly(3-hydroxy valerate), and poly(3-hydroxybutyrate-co-3-hydroxyvalerate), polylactic acid (PLA), polyglycolic acid (PGA), poly(ε-caprolactone) (PCL), starch, and chitosan, as well as combinations thereof. Examples of sintered sealing layer compositions may alternatively include partially bio-based and biodegradable polymers such as polybutylene succinate, poly(butylene adipate-co-terephthalate), PLA blends, and starch blends; and fossil fuel-based and biodegradable polymers such as polybutylene succinate, poly(butylene adipate-co-terephthalate), poly(butylene succinate-co-lactide), poly(butylene succinate-co-terephthalate), poly(ε-caprolactone), polyglycolide, poly(methylene adipate-co-terephthalate), and polyvinyl alcohol.

Non-limiting examples of suitable biodegradable polymers may include bio-based and biodegradable polymers such as cellulose acetate, cellulose acetate butyrate, cellulose acetate propionate, cellulose nitrate, polyhydroxyalkanoates (PHA) such as polyhydroxybutyrate (PHB), poly(3-hydroxy valerate), and poly(3-hydroxybutyrate-co-3-hydroxyvalerate), polylactic acid (PLA), polyglycolic acid (PGA), poly(ε-caprolactone) (PCL), starch, and chitosan; partially bio-based and biodegradable polymers such as polybutylene succinate, poly(butylene adipate-co-terephthalate), PLA blends, and starch blends; and fossil fuel-based and biodegradable polymers such as polybutylene succinate, poly(butylene adipate-co-terephthalate), poly(butylene succinate-co-lactide), poly(butylene succinate-co-terephthalate), poly(ε-caprolactone), polyglycolide, poly(methylene adipate-co-terephthalate), and polyvinyl alcohol. Combinations (blends) of these matrix polymers and/or copolymers thereof may also be utilized in the disclosure herein.

Non-limiting examples of non-biodegradable matrix polymers that may be combined with biodegradable, bio-sourced and/or bio-inspired emulsion stabilizers, also referred to as emulsifying additives, include bio-based polymers such as polyethylene (LDPE, LLDPE, and HDPE), polyamide (such as PA11, PA12), polyethylene terephthalate, polytrimethylene terephthalate; partially bio-based and non-biodegradable polymers such as polybutylene terephthalate, polyethylene terephthalate, polytrimethylene terephthalate, polyvinyl chloride, styrene-butadiene rubber, acrylonitrile-butadiene-styrene, polyurethane, and epoxy resin; fossil fuel-based and non-biodegradable polymers such as PE, polyethylene (LDPE, HDPE), polypropylene, polystyrene, polyvinyl chloride, acrylonitrile-butadiene-styrene, polybutylene terephthalate, polyurethane, PA6, epoxy resin, and synthetic rubber. Combinations (blends) of these matrix polymers and/or copolymers thereof may also be utilized in the disclosure herein.

Other non-biodegradable matrix polymers can include thermoplastic elastomers, natural or synthetic, which can include thermoplastic polyolefin elastomers, thermoplastic vulcanizates (also referred to as elastomeric alloys), thermoplastic polyamides, and copolymers including styrenic block copolymers, thermoplastic copolyesters, and the like. Examples of other suitable thermoplastic elastomers can be found in Handbook of Thermoplastic Elastomers, 2nd ed., B. M. Walker and C. P. Rader, eds., Van Nostrand Reinhold, New York, 1988. Examples of other suitable thermoplastic elastomers for use in the disclosure herein include, but are not limited to, elastomeric polyamides, polyesteramide, polyetheresteramide, polycarbonate-esteramide,methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, polyacrylonitriles, silicones, and the like. Non-biodegradable matrix polymers can include styrenic block copolymers having at least one block selected from the group of isoprene, isobutylene, butylene, ethylene/butylene, ethylene-propylene, and ethylene-ethylene/propylene. More specific examples of elastomeric styrenic block copolymers include, but are not limited to, poly(styrene-ethylene/butylene), poly(styrene-ethyl ene/butylene-styrene), poly(styrene-ethylene/propylene), poly(styrene-ethylene/propylene-styrene), poly(styrene-ethylene/propylene-styrene-ethylene-propylene), poly (styrene-butadiene-styrene), poly(styrene-butylene-butadiene-styrene), the like, and any combination thereof.

Polymer particulates disclosed herein may comprise one or more types of emulsion stabilizers that function to promote emulsion formation during melt emulsification. Nanoparticle emulsion stabilizers may stabilize and control the size and shape of polymer particulates to produce polymer particulates with high circularity, a narrow particulate size distribution, and good particulate flow properties. Depending on type, the emulsion stabilizer may become localized upon at least the surface of the polymer particulates and/or optionally within the core of the polymer particulates.

In suitable examples, polymer particulates may include one or more types of biodegradable, bio-sourced and/or bio-inspired emulsion stabilizers, such as biopolymer nanoparticles, biomineral nanoparticles excluding biomineralized silica alone, or any combination thereof. Suitable biopolymer nanoparticles may be hydrophilic and include entities such as, for example, cellulose nanoparticles (inclusive of cellulose fibers and cellulose nanocrystals), starch nanoparticles, chitosan nanoparticles, lignin nanoparticles, cyclodextrin nanoparticles, protein nanoparticles, and the like. Suitable biomineral nanoparticles may include, for example, hydroxyapatite, silica (silicon dioxide), ferrite, magnetite, calcium carbonate, calcium phosphate, and the like. Biomineral nanoparticles may have crystalline or non-crystalline morphology. Other suitable biomineral nanoparticles may include biomineral composite nanoparticles produced by a living organism using any of the foregoing materials in any combination. In some examples, the polymer particulates disclosed herein may include an emulsion stabilizer such as hydroxyapatite nanoparticles, cellulose nanoparticles (crystalline nanocellulose), and/or starch nanoparticles, which may be combined with a biodegradable or non-biodegradable matrix polymer. Preferably, such emulsion stabilizers may be used in a combination with a biodegradable matrix polymer, such as those specified above.

Emulsion stabilizers suitable for use in the disclosure herein may also include biodegradable nanoparticles prepared from a variety of materials including synthesized biodegradable polymers such as poly-D-L-glycolide, poly-D-L-lactide-co-glycolide, poly-cyanoacrylate, polylactic acid, and poly-e-caprolactone; and biopolymer nanoparticles, including but not limited to, proteins, polysaccharides, chitosan, alginates, collagen, gelatin, hyaluronic acid, and the like.

Polymer particulates disclosed herein may desirably be produced without including silica nanoparticles. As such, unless otherwise specified as containing silica, the polymer particulates disclosed herein may be silica-free. Silica-free polymer particulates may also include those that are produced without using biomineralized silica alone as an emulsion stabilizer. It should be appreciated, however, that it may be advantageous to include silica nanoparticles and/or biomineralized silica in combination with one or more of biopolymer nanoparticle and/or biomineral nanoparticles other than silica in some instances.

It is to be appreciated, however, that polymer particulates disclosed herein may also include biodegradable and/or biologically sourced emulsion stabilizers that are used in combination with oxide nanoparticles that are non-biodegradable or less biodegradable. In some cases, polymer particulates may comprise non-biodegradable oxide nanoparticles, such as silica nanoparticles, alone in combination with a biodegradable matrix polymer. Oxide nanoparticles that may be used in such embodiments may include silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides such as aluminosilicates, borosilicates, and aluminoborosilicates, for example, are also encompassed by the term "oxide." The oxide nanoparticles may by hydrophilic or hydrophobic, which may be native to the nanoparticles or result from surface treatment of the nanoparticles. For example, silica nanoparticles having a hydrophobic surface treatment, like dimethylsilyl, trimethylsilyl, or the like, may be formed through reacting hydrophilic surface hydroxyl groups with a hydrophobic functionalizing agent. Hydrophobically functionalized oxide nanoparticles may be particularly desirable in the present disclosure. Unfunctionalized oxide nanoparticles may also be suitable for use as well.

Particular examples of silica nanoparticles suitable for use in the disclosure herein may be hydrophobically functionalized. Such hydrophobic functionalization may make the silica nanoparticles less compatible with water than unfunctionalized silica nanoparticles. In addition, the hydrophobic functionalization may improve dispersion of the silica nanoparticles in the carrier fluid, which may be highly hydrophobic. The hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent functionalization of a hydrophobic modification. Commercially available hydrophobically functionalized silica nanoparticles include, for example, Aerosil RX50 (Evonik, average particulates size=40 nm) and Aerosil R812S (Evonik, average particulates size=7 nm).

In non-limiting examples, loading of the nanoparticles in the sintered sealing layer composition may range from about 0.01 wt. % to about 10 wt. %, or about 0.05 wt. % to about 10 wt. % or about 0.05 wt. % to about 5 wt. % with respect to the total weight of the polymer. In more particular examples, loading of nanoparticles may range from about 0.1 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. %. Any of biopolymer nanoparticles, biomineral nanoparticles, or oxide nanoparticles, such as silica nanoparticles, may be present in the foregoing concentration ranges. In particular examples, any of hydroxyapatite nanoparticles, cellulose nanoparticles, or oxide nanoparticles, such as silica nanoparticles, may be present in these concentration ranges. Biosourced or bio-inspired nanoparticles, such as hydroxyapatite and/or cellulose nanoparticles, may be present in combination with oxide nanoparticles, such as silica nanoparticles, in any weight ratio ranging from about 99:1 to about 1:99.

In non-limiting examples, the particulate size of the emulsion stabilizers may range from about 1 nm to about 100 nm. In some instances, the particulate size of the emulsion stabilizers may be up to 500 nm. When present, the particulate size of silica nanoparticles may range from about 5 nm to about 75 nm, or about 5 nm to about 50 nm, or about 5 nm to about 10 nm, or about nm to about 20 nm, or about 20 nm to about 30 nm, or about 30 nm to about 40 nm, or about nm to about 50 nm, or about 50 nm to about 60 nm.

Any of biopolymer nanoparticles, biomineral nanoparticles, and/or oxide nanoparticles, such as silica nanoparticles, may be present in the foregoing size ranges. In particular examples, any of hydroxyapatite nanoparticles, cellulose nanoparticles, or oxide nanoparticles, such as silica nanoparticles, may be present over these particulate size ranges.

Emulsion stabilizers disclosed herein may have a BET surface area of about 10 m2/g to about 500 m2/g, or about 10 m2/g to about 150 m2/g, or about 25 m2/g to about 100 m2/g, or about 100 m2/g to about 250 m2/g, or about 250 m2/g to about 500 m2/g.

Additional compositions and methods of manufacture for such biodegradable materials for use in a sealing layer composition may be found in U.S. patent application Ser. No. 17/381,407, which is incorporated by reference herein in its entirety.

Figure 2:
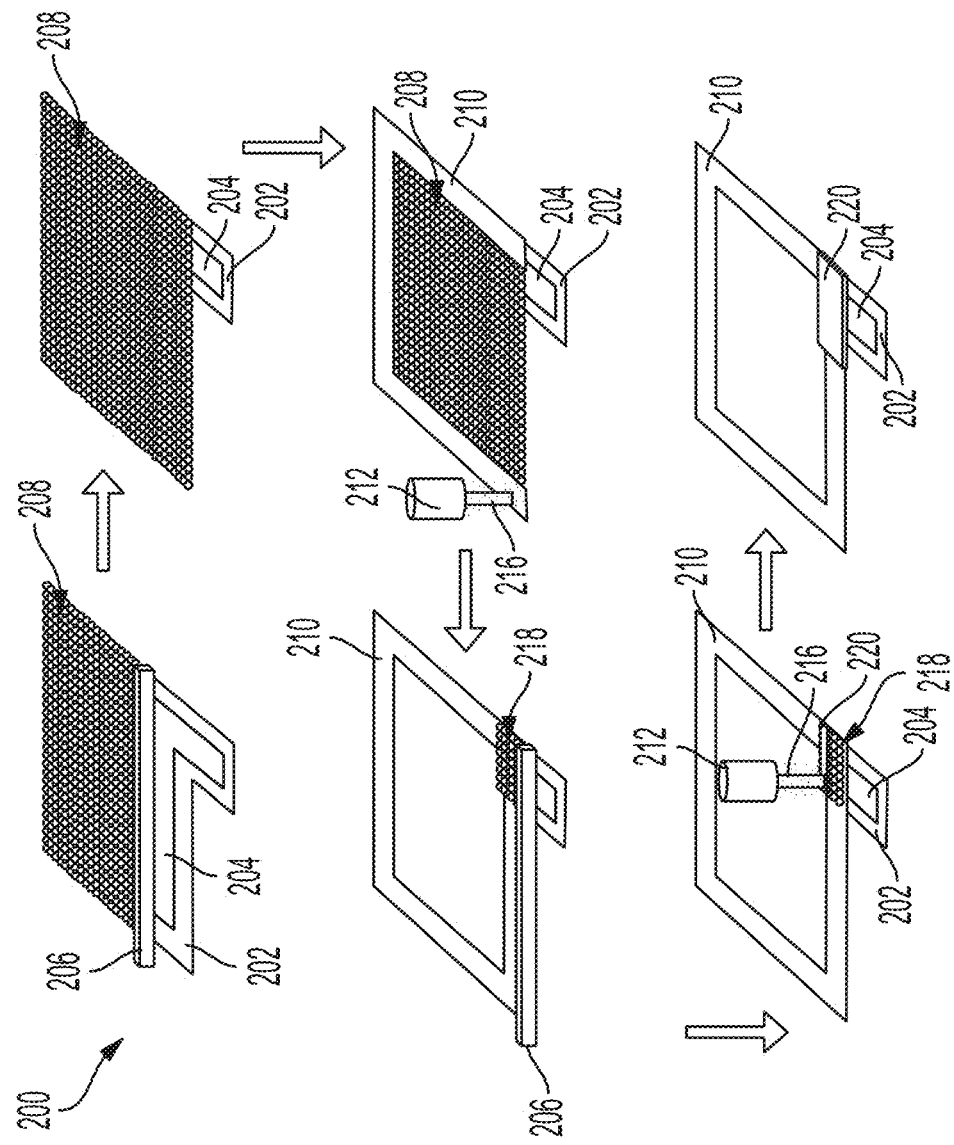
FIG. 2 illustrates a schematic of a process for providing a sealing layer for an electrochemical device using a selective laser sintering technique, in accordance with the present disclosure.

FIG. 2 illustrates a schematic view of a deposition of a sealing layer composition for an electrochemical device using a selective laser sintering process, in accordance with the present disclosure. While this is an example schematic view of a selective laser sintering process 200 suitable for dispensing a sealing layer for an electrochemical device, other means of dispensing a sealing layer or sealing layer composition in accordance with the present disclosure may be employed. The process shown and described in regard to FIG. 2 illustrates a process for 3D printing biodegradable powders making up a sealing layer composition to create a sealing layer, with an added feature of building up thicker reinforcing layers for critical sealing layer areas such as the electrode tabs of a battery and other areas, where leakages often occur. The selective laser sintering process 200 includes a sealing layer composition deposition head 206 used to provide a sealing layer composition 208 onto a substrate layer 202 having an electrode 204 disposed upon the substrate 202. Once the substrate is prepared, the sealing layer composition 208 is dispensed onto the substrate and onto the electrode 204 as well. Next, the sealing layer composition 208 is subjected to sintering by a laser unit 212 having a laser 216 directed towards the deposited sealing layer composition 208, subjecting the sealing layer composition 208 to a temperature greater than or equal to a melting temperature of the sealing layer composition 208 to form a solidified or sintered sealing layer 210. The sintering of the sealing layer composition 208 is conducted in one or more locations, based on the areas or location where a sealing layer is to be finished. Next, any residual sealing layer composition that was not sintered is removed from the substrate. Additional layers of sealing layer composition 218, for example, to complete a total of two or more layers, are deposited by the sealing layer composition deposition head 206 in areas where an additional reinforcement 220 of a sealing layer is desired. These additional layers of sealing layer composition 218 are then subjected to the laser 216 to adhere the finished reinforcement 220 of a sealing layer to any previously sintered sealing layer 210. The layers of sealing layer composition may be disposed in a laterally non-continuous pattern. That is to say, the deposition and sintering of a sealing layer composition can only partially cover the substrate or other surface onto which it is deposited and can be deposited according to a non-continuous pattern. The movement and operation of the sealing layer composition deposition head 206, laser unit 212, or even a platform holding the substrate layer 202 may be externally controlled by instructions received from the computer processing unit to provide a desired pattern and quantity of a deposited or dispensed of a sealing layer composition. The material composition used for the sintered sealing layer composition can include a biodegradable polymer, emulsifying or flow additives, a melting point associated with the composition, a bimodal particle size distribution, melting and/or flowing properties, or a combination of one or more of the aforementioned properties can be advantageous when employed within a sintered sealing layer composition for an electrochemical device. The use of a sintering process with such materials further provides advantages for a sintered sealing layer composition for an electrochemical device. For example, as a sintered sealing layer composition is heated or sintered, the bimodal particle size distribution in combination with melt flow properties or emulsifying additives can provide a formed sealing layer where interstitial gaps between particles are more readily filled, overlapped, or packed within the layer, providing a more effective barrier to moisture escape from an electrochemical device. In certain aspects of the present disclosure, remnants of particles, while fully welded and providing the benefits of a fully processed sealing layer, may still exhibit detectable welding artifacts in a sealing layer when viewed under certain analytical techniques, for example, light microscopy. Material properties of sealing layers of the present disclosure may include a range of rubbery to plastic properties depending on the particular electrochemical device design and the particular sealing layer composition.

This method for producing a sealing layer in an electrochemical device, or other device may include one or more steps of the following sequence: an initial step to deposit a sealing layer composition in the form of a dry, sinterable powder, passing a laser or other heating device in proximity to one or more portions or locations of the deposited sealing layer composition powder, melting or sintering the sealing layer composition to form a solid sealing layer, cleaning, clearing or removing away any unsintered sealing layer composition material, and repeating to build up a desired sealing layer thickness. Sealing layer sintering temperatures depend upon the sealing layer composition and may range from about 40° C. to about 250° C., from about 50° C. to about 200° C., or from about 60° C. to about 180°. In certain examples, sealing layer thickness may range from about 20 μm to about 300 μm, from about 50 μm to about 150 μm, or from about 50 μm to about 100 μm. Additional thickness or multiple layers may be provided in certain areas or locations of an electrochemical device that may be prone to leakages, weaknesses, or additional stresses during use or production, to provide reinforcement in these areas. These areas of additional thickness, also referred to as reinforcement, may add an additional thickness of from about 20 μm to about 300 μm, from about 50 μm to about 150 μm, or from about 50 μm to about 100 μm. In certain examples, mixtures of different classes of biodegradable materials may be used or blended within a sealing layer composition or across multiple sealing layers disposed within a sealing layer. In certain examples, a cooling step may be provided in the method of producing a sealing layer in an electrochemical device. Sealing may be conducted in certain examples, while liquid portions of an electrochemical device are present, and may be tacky prior to proceeding with additional steps in the sealing layer production or in additional assembly steps of an electrochemical device. In certain examples, heat pressing or laminating a "sandwiched construction" of an electrochemical device having a sealing layer deposited in accordance with the present disclosure may be provided. It should be noted that polymers have melting points or other properties that lend themselves to heat sealing devices may be used or blended with biodegradable polymers to provide additional advantages to sealing layer compositions as disclosed herein, while still maintaining materials that are largely biodegradable in composite form. In certain examples, non-fluorinated polymers may be used. In other examples, mixtures of various sizes of particle size distributions of one or more biodegradable polymers or sealing layer compositions may be used, and may be advantageous for filling gaps or interstices within a sealing layer or within a structure of an electrochemical device. In certain examples, sintering or melting may be done using another form of non-contact heating, such as radiant heating, microwave heating, and the like.

Electrochemical devices, 3D printed batteries, or other devices in accordance with the present disclosure provide a sealing layer composition and process to provide a sealing layer having a variable thickness to minimize moisture loss within the electrochemical device and therefore provide a more effective moisture barrier around the periphery of an electrochemical device. A 3D printed battery sealing layer or electrochemical device sealing layer comprised of biodegradable particles in a 3D selective laser sintering (SLS) is also provided.

EXAMPLES

Example 1: (AC0237) PCL Microsphere Powder for SLS

In a 500 mL glass kettle equipped with heated mantle 280 g of poly(dimethylsiloxane) (PDMS) PSF-30000 from Clearco, 2.4 g Aerosil RX50 silica nanoparticles (2.0 wt. %), and 120 g poly(ε-caprolactone) (PCL) from Sigma-Aldrich (Mn 80,000) were added. An overhead stirrer was set to 300 rpm with one P4 propeller stirrer. Repeated (3×) applications of vacuum and argon purges were applied to remove dissolved air and a flow of argon was maintained throughout the process. The temperature was increased to 140° C. over a 10 min time period. Once the temperature reached 140° C. the stirring speed was increased to 500 rpm. After 30 min, the glass kettle was removed from heating and stirring was stopped. The emulsion was left to cool to room temperature. The slurry was dispersed in excess heptane and vacuum filtrated. This dispersion and filtration process step was carried out three times in total to remove any silicone oil traces. The particles were dried at room temperature overnight and then sieved through a U.S.A. Standard Sieve A.S.T.M. E11 with opening of 250 μm.

Example 2: (AC0238) PLA Microsphere Powder for SLS

Example 2 was prepared in the manner of Example 1 with the exception that poly(L-lactide) (PLA) from Ingeo (Biopolymer 3D850) was used instead of PCL and 1.0 wt % (1.2 g) Aerosil RX50 silica nanoparticles was used instead of 2.0 wt %. The reaction temperature was also raised to 210° C. instead of 140° C. Table 1 is a summary of the general process conditions and materials used in Examples 1 and 2. For Examples 1 and 2, repeated (3×) applications of vacuum and nitrogen purges were used while stirring reaction mixture. Both examples utilized a 500 mL Kettle, 30K cSt PDMS, at 30% solids loading. At the set temperature, stirring revolutions per minute (RPM) was slowly ramped to 500 RPM. Hold at temperature for 30 min, wash with heptane and air dry at room temperature.

TABLE 1

| Formulation | | Process Conditions | | |
|---|---|---|---|---|
| Example | Polymer | Pre-drying | Set Temp. | Max Temp. |
| Example 1-AC0242 | PCL | 50° C./overnight (vacuum oven) | 140° C. | 140° C. |
| Example 2 - AC0238 | PLA | 80° C./4 hours | 210° C. | 210° C. |

As shown in Table 2, the molecular weights for the above examples were reduced during the process, between 15-25%. The effect of the decreased molecular weight appears to increase with increasing process temperature, and without wishing to be bound by any particular theory, it is believed that hydrolysis from moisture traces in the polymer and the silicone oil is the cause of this molecular weight reduction.

TABLE 2

| Example | Polymer | Additive | Mn |
|---|---|---|---|
| Example 1- AC0242 | PCL | 2 wt % RX50 | 133,438 |
| | | | 112, 588 |
| Example 2 - AC0238 | PLA | 1 wt % RX50 | 48, 272 |
| | | | 35,636 |

Figure 3:
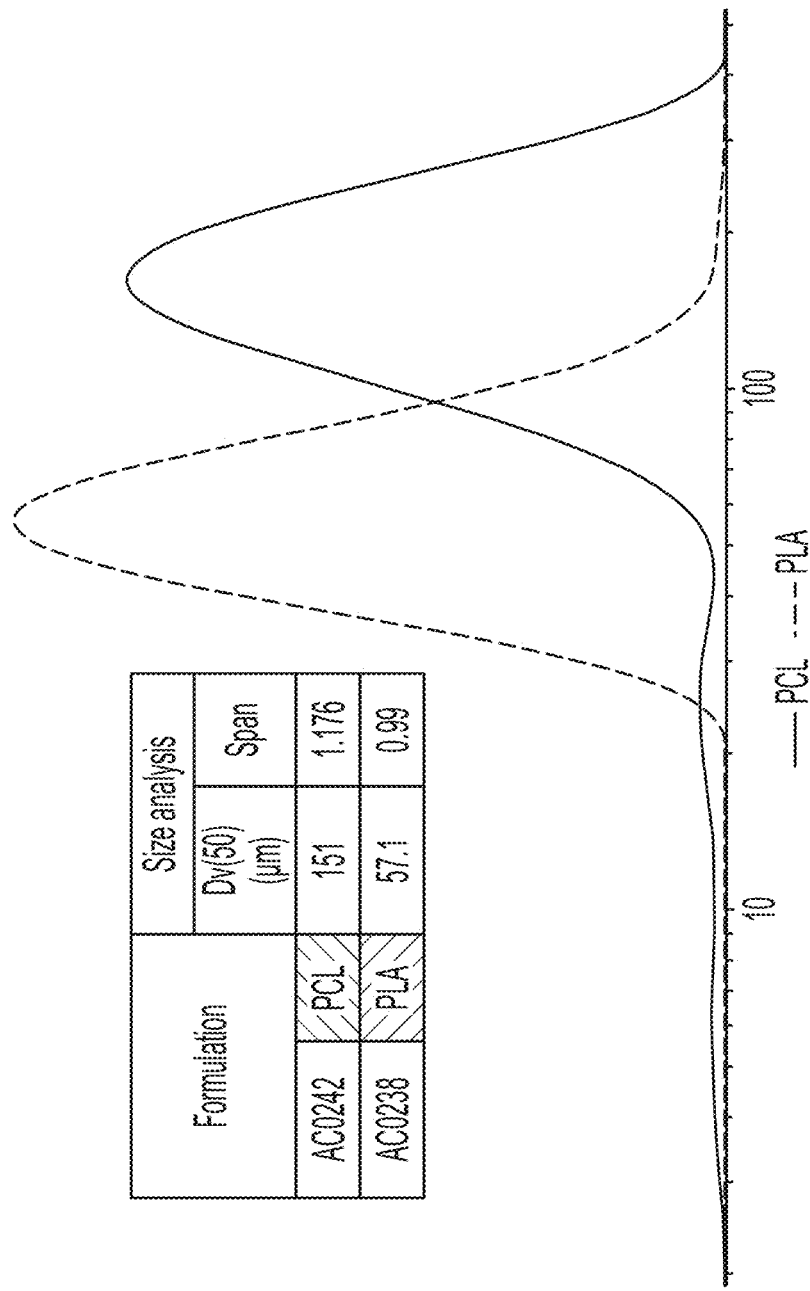
FIG. 3 is a chart depicting particle size analysis results for sealing layer compositions, in accordance with the present disclosure.

FIG. 3 is a chart depicting particle size analysis results for sealing layer compositions, in accordance with the present disclosure. The particle sizes and distribution of the products of the examples are shown, as measured by laser diffraction analysis using a Mastersizer 3000. PLA particles produced were smaller, having a Dv(50) of 151 μm with a narrower size distribution span of 1.176 as compared to the PCL particles, which exhibited a Dv(50) of 57.1 μm with a size distribution span of 0.99. The formation of a small percentage of small particles was observed in the PCL powder. The particle sizes for sealing layer compositions can have a Dv(50) range from 1 μm to about 250 μm. For example, the particle sizes for sealing layer compositions can have a Dv(50) from greater than or equal to about 10 μm to about greater than or equal to about 175 μm, from greater than or equal to about 25 μm to about greater than or equal to about 150 μm, or from greater than or equal to about 50 μm to about greater than or equal to about 100 μm. In certain examples, where there is a bimodal particle size distribution, each portion of the particle size distribution may be in one or more of the ranges disclosed herein.

Figure 4:
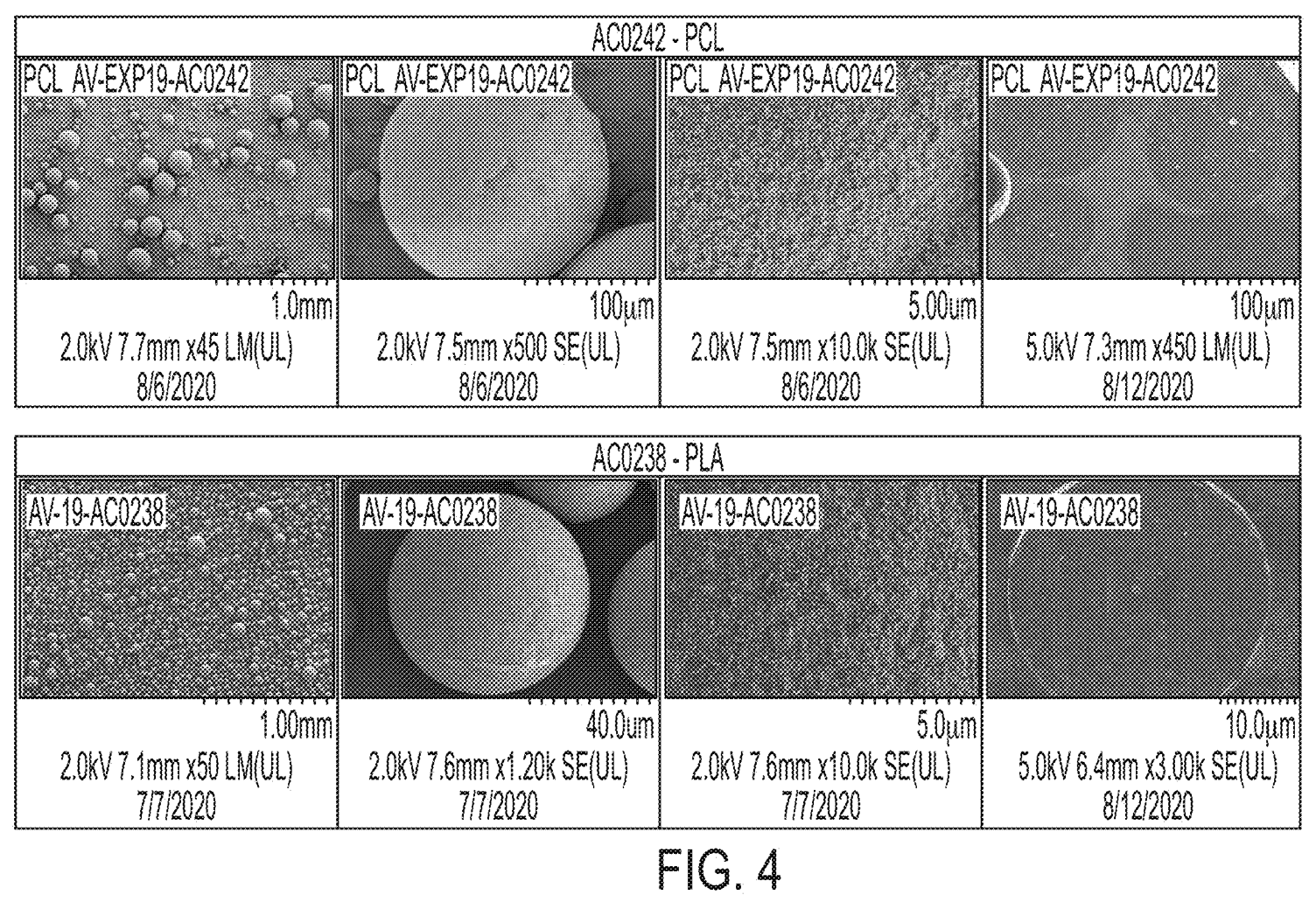

FIG. 4 depicts a series of scanning electron microscope images of powder particles for use in sealing layer compositions, in accordance with the present disclosure. Scanning electron microscope (SEM) images of the powder particles used in the sealing layer compositions can be seen in FIG. 4, with images of each of the preceding Examples 1 and 2 shown at a first magnification in top view and cross-section and a second magnification in top view and cross-section, from left to right. The images illustrate that the PCL particles with silica from Example 1 (AC0242) appear spherical and show a bimodal distribution including a significant population of significantly smaller particles, confirming the observations from the Mastersizer of the particle size distribution analysis, as shown in in FIG. 3. Some slightly irregular shaped particles can be seen while silica nanoparticles distribution on the surface appears to provide adequate coverage. Little to no silica can be found in the cross-section of the particles. The images illustrate that the PLA particles from Example 2 (AC0238) are highly spherical and show a somewhat bimodal size distribution while the silica nanoparticles have adequate distribution on the surface of the particles. No silica can be seen in the cross-section of the particles from Example 2.

Figure 5:
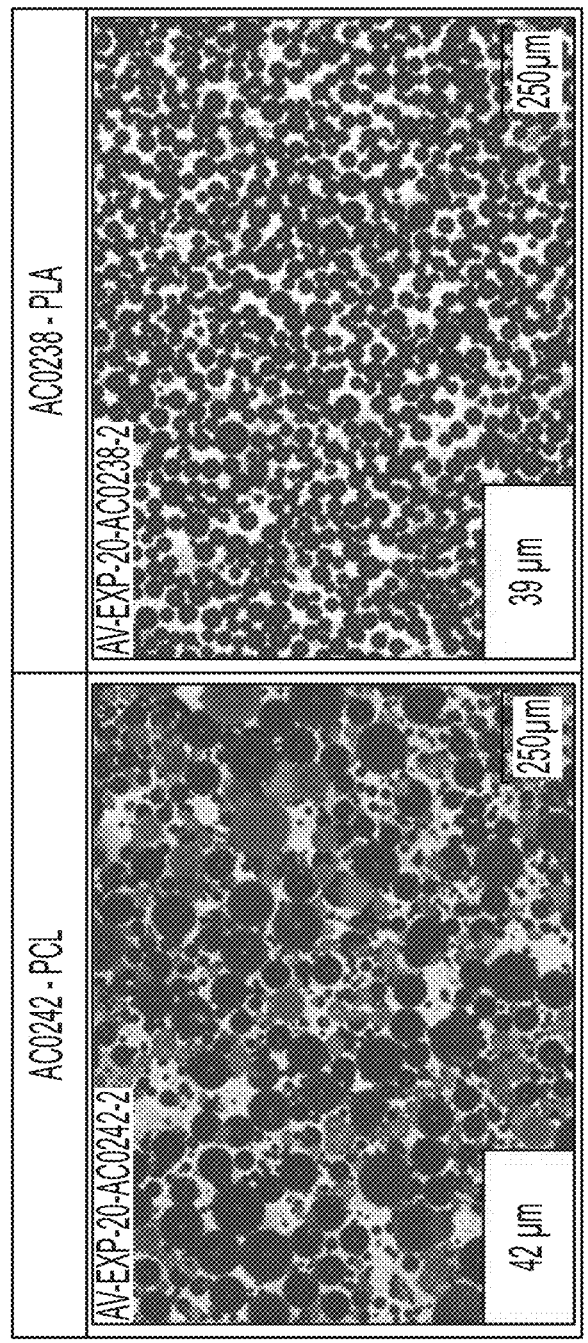
FIG. 5 depicts polarized optical microscope images of powder particles for use in sealing layer compositions, in accordance with the present disclosure.

FIG. 5 depicts polarized optical microscope images of powder particles for use in sealing layer compositions, in accordance with the present disclosure. Optical microscopy images of samples from Example 1 (AC0242-PCL) and Example 2 (AC0238-PLA) and the calculated average circle equivalent diameters, 42 μm and 39 μm, respectively, are shown in FIG. 5. The results confirm the good sphericity of the prepared powder particles. Particle sizes are, as calculated, lower as compared to the measurements conducted with the Mastersizer, as shown in FIG. 3. Without being bound by any particular theory, it may be that the Mastersizer can, in some instances, overestimate particle size by measuring aggregated particles as single particles.

Table 3 exhibits Differential Scanning Calorimetry (DSC) data demonstrating that the emulsifying additives can act as nucleating agents to promote the crystallization of the polymers. Crystallization temperature (Tc1) is noted during cooling at 10° C./min of the example samples. This is relevant, as it is common for biopolyesters such as PLA to have slow crystallization kinetics which can complicate their processing in certain conditions. Fast and controlled crystallization is desirable when preparing 3D materials, particularly for the achievement of desired mechanical properties. The difference between the crystallization temperature and the melting temperature may be referred to as the sintering window, or an effective temperature range where the polymer particles will sinter to form a cohesive seal, in accordance with the present disclosure. In certain examples, a wider sintering window of at least 20-25° C. situated between the Tc onset and Tm onset may be appropriate to provide additional time for multiple layers to fully sinter together. If the sintering window is lower, the composition sealing layer can be compromised due to inadequate melting. In some examples, conditioning a sealing composition powder prior to use can also be advantageous to promote full sintering of sealing layer composition. Furthermore, a wider sintering window can reduce or avoid premature crystallization and sealing layer distortion, and improve part definition and release of sealing layer compositions from the powder bed.

TABLE 3

| Sample | Additive | $Tc_1$ (° C.) | $Tm_1$ (° C.) | $\Delta T (Tm_1 - Tc_1)$ Sintering Window |
|---|---|---|---|---|
| PLA | — | — | 177.36 | — |
| Example 1 - AC0238 | 1 wt % RX50 | 149.6 | 173.66 | 24.06 |
| PCL | — | 18.82 | 58.81 | 39.99 |
| Example 2 - AC0242 | 2 wt % RX50 | 27.37 | 59.31 | 31.94 |

Angle of Repose (AoR) measurements of Example 1 and Example 2, can be seen in Table 4. The PCL powder exhibited a value of 28.5°, which corresponds to excellent flow properties, while the PLA powder had good flow properties with an AoR value of 34.0°, although ranges of from about 20° to about 40° can provide sealing layer compositions having adequate spreading properties during processing.

TABLE 4

| Example | Polymer | AoR (°) |
|---|---|---|
| Example 1 - AC242 | PCL | 28.5 |
| Example 2 - AC0238 | PLA | 34.0 |

Figure 6:
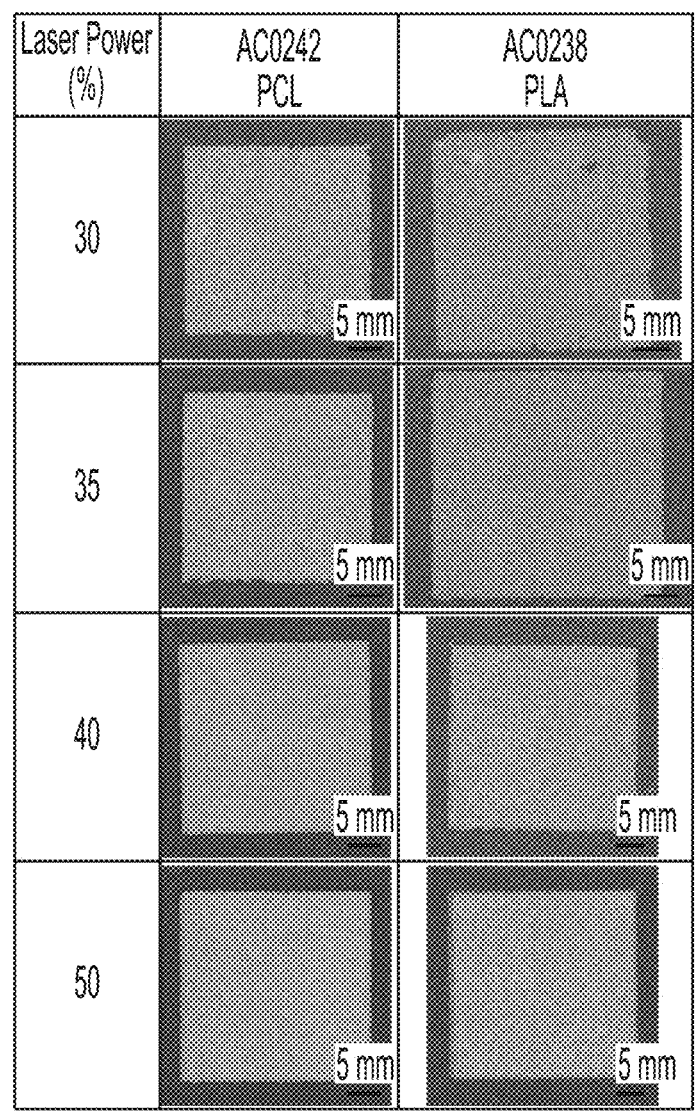
FIG. 6 depicts images of sintered single layers of powder particles for use in sealing layer compositions providing a qualitative view of sealing layer porosity, in accordance with the present disclosure.

FIG. 6 depicts images of sintered single layers of powder particles for use in sealing layer compositions providing a qualitative view of sealing layer porosity, in accordance with the present disclosure.

The powders forming the sealing layer compositions made in Example 1 and Example 2 exhibited good flow and formed uniform coatings in the SLS testing experiments. No soft aggregates were observed and no blocking after the heat cycles was observed. Blocking is a qualitative evaluation of particle or powder flowability and agglomeration that can detrimentally impact re-use of unsintered powder used in a powder bed process. Particles that do not exhibit issues related to blocking provide more reusability of powder and thus improve efficiency and waste reduction in sealing layer compositions of the present disclosure. Very little powder was observed adhering onto the back of the printed layers, which were processed according to the parameters listed in Table 5. All samples required at least 30% laser power for successful sintering. Some edge curl during cooling was observed in some samples, more so in PCL as compared to PLA. Single layer porosity observed was very low, but evident in some PLA as compared to PCL. A summary of mass and voids of PCL and PLA samples of Example 1 and Example 2 is listed in Table 5. The 3D printed sealing layers, using SLS, are shown in FIG. 6. Laser movement is expressed in points per second (pps).

TABLE 5

| | | | Mass (g) | | Voids (%) | |
|---|---|---|---|---|---|---|
| Laser Power (%) | Scan Rate (pps) | Temp. (° C.) | Ex. 1 - AC0242 PCL | Ex. 2 - AC0238 PLA | Ex. 1 - AC0242 PCL | Ex. 2 - AC0238 PLA |
| 30 | 40000 | PLA = 130 PCL = 40 | 0.1683 | 0.0716 | 1.08 | 2.20 |
| 35 | 40000 | PLA = 130 PCL = 40 | 0.1749 | 0.0937 | 0.55 | 0.90 |
| 40 | 40000 | PLA = 130 PCL = 40 | 0.1883 | 0.1037 | 0.23 | 0.72 |
| 45 | 40000 | PLA = 130 PCL = 40 | 0.1883 | 0.1186 | 0.31 | 0.22 |
| 50 | 40000 | PLA = 130 PCL = 40 | 0.2060 | 0.1347 | 0.54 | 0.08 |
| 55 | 40000 | PLA = 130 PCL = 40 | 0.2073 | 0.1324 | 0.09 | 0.05 |

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or examples of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated example. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other examples of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An electrochemical device, comprising:
   a first substrate;
   a first electrode disposed upon the first substrate;
   a second substrate; and
   a sintered sealing layer composition comprising a biodegradable material disposed between the first substrate and the second substrate.

2. The electrochemical device of claim 1, further comprising a second electrode disposed upon the first substrate, wherein the first electrode and the second electrode are disposed in a lateral X-Y plane geometry.

3. The electrochemical device of claim 1, further comprising a second electrode disposed upon the second substrate, wherein the first electrode and the second electrode are disposed in a stacked geometry.

4. The electrochemical device of claim 1, wherein the sintered sealing layer composition forms a moisture barrier for the electrochemical device.

5. The electrochemical device of claim 1, wherein the sintered sealing layer composition comprises poly($\varepsilon$-caprolactone) (PCL), polylactic acid (PLA) or a combination thereof.

6. The electrochemical device of claim 1, wherein the sintered sealing layer composition comprises a biodegradable polymer and an emulsifying additive.

7. The electrochemical device of claim 6, wherein the emulsifying additive comprises silicon dioxide.

8. The electrochemical device of claim 6, wherein the emulsifying additive is present in the sintered sealing layer composition in an amount of from about 1.0% to about 10.0% based on a total weight of the sintered sealing layer composition.

9. The electrochemical device of claim 1, wherein the sintered sealing layer composition is disposed between the first substrate and the second substrate in a laterally non-continuous pattern.

10. The electrochemical device of claim 1, wherein the sintered sealing layer composition comprises a particle having a Dv(50) particle size of from about 20 μm to about 150 μm prior to sintering.

11. The electrochemical device of claim 10, wherein the sintered sealing layer composition comprises a bimodal particle size distribution.

12. The electrochemical device of claim 1, wherein the sintered sealing layer comprises a first portion and a second portion, the second portion comprising a thickness greater than that of the first portion.

13. A sealing layer composition, comprising:
   a biodegradable polymer, wherein:
      the biodegradable polymer comprises a bimodal particle size distribution; and
      the sealing layer composition is sintered.

14. The sealing layer composition of claim 13, further comprising an emulsifying additive.

15. The composition of claim 13, wherein the sintered sealing layer composition is incorporated into an electrochemical device and forms a moisture barrier for the electrochemical device.

16. The composition of claim 15, wherein the electrochemical device comprises a battery.

17. A method of producing a sealing layer for an electrochemical device, comprising:
   preparing a substrate;
   dispensing a sealing layer composition onto the substrate;
   sintering the sealing layer in one or more locations using a laser; and
   removing any residual sealing layer composition from the substrate that was not sintered; and
   wherein the sintered sealing layer comprises a biodegradable material and forms a moisture barrier for the electrochemical device.

18. The method of producing a sealing layer of claim 17, wherein the sealing layer is subjected to a temperature greater than or equal to a melting temperature of the sealing layer composition.

19. The method of producing a sealing layer of claim 17, further comprising depositing two or more layers of sealing layer composition.

* * * * *